US008663776B2

(12) United States Patent
Goering et al.

(10) Patent No.: US 8,663,776 B2
(45) Date of Patent: Mar. 4, 2014

(54) CORNER FITTING PREFORMS AND METHOD OF MAKING THEREOF

(75) Inventors: Jonathan Goering, York, ME (US); Michael McClain, Barnstead, NH (US)

(73) Assignee: Albany Engineered Composites, Rochester, NH (US)

( * ) Notice: Subject to any disclaimer, the term of this patent is extended or adjusted under 35 U.S.C. 154(b) by 402 days.

(21) Appl. No.: 13/079,503

(22) Filed: Apr. 4, 2011

(65) Prior Publication Data
US 2012/0251793 A1 Oct. 4, 2012

(51) Int. Cl.
*B32B 3/02* (2006.01)

(52) U.S. Cl.
USPC ............. 428/81; 428/130; 442/205; 442/206; 442/207; 442/218; 139/35; 139/384 R

(58) Field of Classification Search
USPC .................... 442/205–207, 218; 428/81, 130; 139/35, 384 R
See application file for complete search history.

(56) References Cited

U.S. PATENT DOCUMENTS

| 4,256,790 A | 3/1981 | Lackman et al. |
| 4,331,495 A | 5/1982 | Lackman et al. |
| 5,394,906 A | 3/1995 | Farley |
| 5,429,853 A | 7/1995 | Darrieux |
| 5,783,279 A | 7/1998 | Edgson et al. |
| 6,103,337 A | 8/2000 | Burgess |
| 6,446,675 B1 | 9/2002 | Goering |
| 6,874,543 B2 | 4/2005 | Schmidt et al. |
| 7,712,488 B2 | 5/2010 | Goering et al. |

FOREIGN PATENT DOCUMENTS

EP 0 236 500 A 9/1987

OTHER PUBLICATIONS

International Search Report and Written Opinion issued by European Patent Office for corresponding international application PCT/US2012/032154 dated Sep. 24, 2012.

*Primary Examiner* — Elizabeth Cole
(74) *Attorney, Agent, or Firm* — Frommer Lawrence & Haug LLP; Ronald R Santucci

(57) ABSTRACT

A corner fitting preform and a method of forming a corner fitting preform including steps integrally weaving a base or parent material with one or more flanges or legs that extend from the base is disclosed. The flat woven preform includes specially engineered areas within the legs or flanges that have continuous warp yarns which are not woven. The unwoven areas provide a hinge which allows the flanges of the preform to fold around a corner. After folding, the excess unwoven warp yarns are pulled back through the woven portion of the legs or flanges to produce a preform with continuous warp yarn reinforcement around the corner.

24 Claims, 5 Drawing Sheets

CORNER FITTING PREFORMS AND METHOD OF MAKING THEREOF

INCORPORATION BY REFERENCE

All patents, patent applications, documents, references, manufacturer's instructions, descriptions, product specifications, and product sheets for any products mentioned herein are incorporated herein by reference, and may be employed in the practice of the invention.

FIELD OF THE INVENTION

This invention generally relates to woven preforms and particularly relates to woven preforms used in reinforced composite materials. More particularly, the present invention relates to corner fitting preforms that can be shaped into curved or angled shapes with continuous fiber reinforcement at the corners thereof.

BACKGROUND OF THE INVENTION

The use of reinforced composite materials to produce structural components is now widespread, particularly in applications where their desirable characteristics of light weight, high strength, toughness, thermal resistance, and ability to being formed and shaped can be used to great advantage. Such components are used, for example, in aeronautical, aerospace, satellite, high performance recreational products, and other applications.

Typically, such components consist of reinforcement materials embedded in matrix materials. The reinforcement component may be made from materials such as glass, carbon, ceramic, aramid, polyester and/or other materials which exhibit desired physical, thermal, chemical and/or other properties, chief among which is great strength against stress failure.

Through the use of such reinforcement materials, which ultimately become a constituent element of the completed component, the desirable characteristics of the reinforcement materials, such as very high strength, are imparted to the completed composite component. The typical constituent reinforcement materials may be woven, knitted or otherwise oriented into desired configurations and shapes for reinforcement preforms. Usually particular attention is paid to ensure the optimum utilization of the properties for which the constituent reinforcing materials have been selected. Usually such reinforcement preforms are combined with matrix material to form desired finished components or to produce working stock for the ultimate production of finished components.

After the desired reinforcement preform has been constructed, matrix material may be introduced to and into the preform, so that typically the reinforcement preform becomes encased in the matrix material and matrix material fills the interstitial areas between the constituent elements of the reinforcement preform. The matrix material may be any of a wide variety of materials, such as epoxy, polyester, vinyl-ester, ceramic, carbon and/or other materials, which also exhibit desired physical, thermal, chemical and/or other properties. The materials chosen for use as the matrix may or may not be the same as that of the reinforcement preform and may or may not have comparable physical, chemical thermal or other properties. Typically, however, they will not be of the same materials or have comparable physical, chemical, thermal, or other properties, since a usual objective sought in using composites in the first place is to achieve a combination of characteristics in the finished product that is not attainable through the use of one constituent material alone. So combined, the reinforcement preform and the matrix material may then be cured and stabilized in the same operation by thermosetting or other known methods, and then subjected to other operations toward producing the desired component. It is significant to note at this point that after being so cured, the then solidified masses of the matrix material normally are very strongly adhered to the reinforcing material (e.g., the reinforcement preform).

As a result, stress on the finished component, particularly via its matrix material acting as an adhesive between fibers, may be effectively transferred to and borne by the constituent material of the reinforcement preform. Any break or discontinuity in the reinforcement preform limits the ability of the preform to transfer and bear the stress applied to the finished component.

Frequently, it is desired to produce components in configurations that are other than such simple geometric shapes as, for example, plates, sheets, rectangular or square solids, etc. A way to do this is to combine such basic geometric shapes into the desired more complex forms. One such typical combination is made by joining reinforcement preforms made as described above at an angle (typically a right-angle) with respect to each, other. Usual purposes for such angular arrangements of joined reinforcement preforms are to create a desired shape to form a reinforcement preform that includes one or more end walls or "T" intersections for example, or to strengthen the resulting combination of reinforcement preforms and the composite structure which it produces against deflection or failure upon it being exposed to exterior forces, such as pressure or tension. In any case, a related consideration is to make each juncture between the constituent components as strong as possible. Given the desired very high strength of the reinforcement preform constituents per se, weakness of the juncture becomes, effectively, a "weak link" in a structural "chain."

An example of an intersecting configuration is set forth in U.S. Pat. No. 6,103,337, the disclosure of which is incorporated herein by reference. This reference sets forth an effective means of joining together two reinforcing plates into a T-form. This can be accomplished by joining a first reinforcing panel to a second reinforcing panel placed on edge against the first panel.

Various other proposals have been made in the past for making such junctures. It has been proposed to form and cure a panel element and an angled stiffening element separate from each other, with the latter having a single panel contact surface or being bifurcated at one end to form two divergent, co-planar panel contact surfaces. The two components are then joined by adhesively bonding the panel contact surface(s) of the stiffening element to a contact surface of the other component using thermosetting adhesive or other adhesive material. However, when tension is applied to the cured panel or the skin of the composite structure, loads at unacceptably low values resulted in "peel" forces which separate the stiffening element from the panel at their interface since the effective strength of the joint is that of the adhesive and not that of the matrix or the reinforcement materials.

The use of metal bolts or rivets at the interface of such components is unacceptable because such additions at least partially destroy and weaken the integrity of composite structures themselves, add weight, and introduce differences in the coefficient of thermal expansion as between such elements and the surrounding material.

Other approaches to solving this problem have been based on the concept of introducing high strength fibers across the joint area through the use of such methods as stitching one of the components to the other and relying upon the stitching thread to introduce such strengthening fibers into and across the juncture site. One such approach is shown in U.S. Pat. No. 4,331,495 and its method divisional counterpart, U.S. Pat. No. 4,256,790. These patents disclose junctures having been made between a first and second composite panel made from adhesively bonded fiber plies. The first panel is bifurcated at one end to form two divergent, co-planar panel contact surfaces in the prior art manner, that have been joined to the second panel by stitches of uncured flexible composite thread through both panels. The panels and thread have then been cured simultaneously or "co-cured." Another method to improve upon junction strength is set forth in U.S. Pat. No. 5,429,853.

While the prior art has sought to improve upon the structural integrity of the reinforced composite and has achieved success, particularly in the case of U.S. Pat. No. 6,103,337, a desire exists to improve thereon or address the problem through an approach different from the use of adhesives or mechanical coupling. In this regard, one approach might be to create a woven three dimensional ("3D") structure by specialized machines. However, the expense involved is considerable and rarely is it desirable to have a weaving machine directed to creating a single structure. Despite this fact, 3D preforms which can be processed into fiber reinforced composite components are desirable because they provide increased strength relative to conventional two dimensional laminated composites. These preforms are particularly useful in applications that require the composite to carry out-of-plane loads. However, the prior-art preforms discussed above have been limited in their ability to withstand high out-of-plane loads, to be woven in an automated loom process, and in some cases, to provide for varying thickness of portions of the preform.

Another approach would be to weave a two dimensional ("2D") structure and fold it into a 3D shape. Early attempts at folding 2D preforms into 3D shapes typically resulted in parts that distort when the preform was folded. The distortion occurs because the lengths of fiber as-woven are different than what they should be when the preform is folded. This causes dimples and ripples in areas where the as-woven fiber lengths are too short, and buckles in the areas where fiber lengths are too long. An example of a 3D preform weave architecture, which may lead to ripples or loops in areas where the preform is folded, is disclosed in U.S. Pat. No. 6,874,543, the entire content of which is incorporated herein by reference.

One approach to solve the problem of distortion upon folding is disclosed in U.S. Pat. No. 6,446,675, the entire content of which is incorporated herein by reference. This reference provides for a 2D structure that can be folded into a T-shaped, or Pi-shaped, 3D structure, so called because the folded portion of the preform may produce either one or two legs or flanges (for T- and Pi-shapes, respectively) generally perpendicular to the base or parent material. This is accomplished by adjusting the length of fibers during weaving to prevent the above mentioned dimples and buckles at the site of the fold. In the weaving process, some fibers are woven too long, and others woven too short, in the region of the fold. The short and long fibers are then equalized in length as the preform is folded, yielding a smooth transition at the fold.

The benefit of folded preforms is the strength of the joint between the panel to be reinforced and the reinforcing panel. As they are woven together, the panels share reinforcing material and in the final composite, matrix material, creating a unitary construction. The juncture between the integrally woven reinforcement flange or leg and the parent material or base is no longer the weak link, relying solely upon the strength of the adhesive for the strength of the joint, as in the prior art reinforcements. Instead, the fibers of the preform integrally weave the legs and the base together.

Frequently, however, complex shapes, such as curves or sharp corners, require reinforcement. Folded T- or Pi-shaped reinforcements require darting of the legs in order to accommodate a curved or angled surface. As the flange material of a folded preform assumes a curved or angled shape, the length of the curved surface necessarily varies from the inside of the curvature to the outside. The arc length of outside of the curvature, the surface with the larger radius when curved, increases, while on the inside of the curvature, the arc length decreases. The legs of typical folded preforms cannot change length as required to accommodate a curved or angled surface. To accommodate a curved or angled surface, the legs must be darted, that is they must be cut in order to allow the leg to conform to the changed arc length.

Typically, the cut is along the localized radius of curvature, but other, non-radial cuts may also be used to accommodate the change in length. To allow for the decreased length on the inside of a curved preform, the leg is cut and the cut edges allowed to overlap, or the excess material is removed. Similarly, to accommodate the increased length on the outside of the curvature, the leg is cut, resulting in a triangular gap between cut edges of the leg. In either configuration, the darting breaks the continuity of the reinforcing material in each leg. Darting the legs of a 3D T- or Pi-preform can seriously degrade the load carrying capabilities of the preform, because darting involved cutting the fibers that provide the primary load path around the corner.

SUMMARY OF THE INVENTION

Accordingly, a need exists for a woven corner preform or fitting that can be woven using a conventional loom, and provides for reinforcing fibers in all three planes of the corner fitting.

Therefore, it is an object of the present invention to provide a corner fitting and a method of forming a corner fitting having continuous yarns connecting all sides without the need for darting.

It is another object of the present invention to provide a corner fitting and a method of forming a corner fitting having continuous yarns connecting all sides that is formed from a flat woven fabric.

One aspect of the present invention is a corner fitting preform including a woven base and one or more flanges or legs integrally woven with the base. The preform includes specially engineered areas within the legs or flanges that have continuous warp yarns which are not woven. The unwoven areas of the legs or flanges provide a hinge which allows the flanges of the preform to fold around a corner. After folding, the excess unwoven warp yarns are pulled back through the woven portion of the legs or flanges to produce a preform with continuous warp yarn reinforcement around the corner.

A further aspect of the present invention is a method of forming a corner fitting preform including the steps of integrally weaving a base or parent material with one or more flanges or legs that extend from the base. The flat woven preform includes specially engineered areas within the legs or flanges that have continuous warp yarns which are not woven. The unwoven areas provide a hinge which allows the flanges of the preform to fold around a corner. After folding, the excess unwoven warp yarns are pulled back through the woven portion of the legs or flanges to produce a preform with continuous warp yarn reinforcement around the corner.

Once the corner fitting is created, it can then be made into a composite in any known manner or incorporated into a larger preform or structure which in turn is made into a composite.

The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which preferred embodiments of the invention are illustrated in the accompanying drawings in which corresponding components are identified by the same reference numerals.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
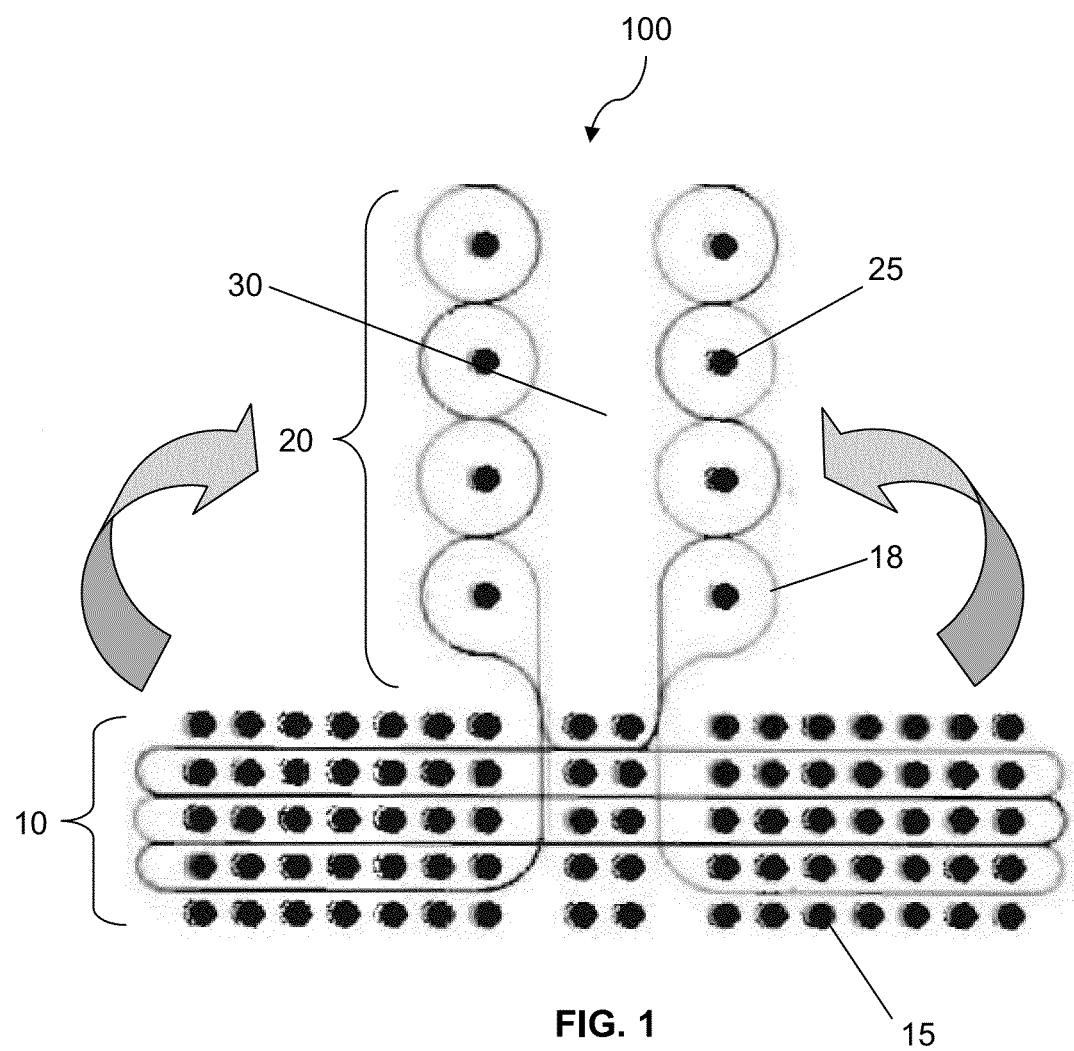
FIG. 1 is a cross-sectional view of a woven corner fitting preform according to one aspect of the present invention.

Turning now to the figures, FIG. 1 is a cross-sectional view of a Pi-preform 100 formed according to one exemplary embodiment of the present invention. The preform 100 is a flat woven preform, which can be woven on a conventional loom using any weave pattern known to one of ordinary skill in the art, plain weave being the most preferable pattern. Preform 100 can be woven using two or more layers of warp yarns or fibers 15 and one or more layers of weft yarns or fibers 18. Since the preform according to the embodiment shown in FIG. 1 is flat woven, weft yarn 18 traverses along the width of the preform.

As it can be seen from the exemplary embodiment shown in FIG. 1, warp yarns 15 and 25 can be arranged, for example, in six layers. The bottom five layers, for example, form the base 10 of the preform, while the top layer can be used to form the one or more flanges of legs 20 of the preform 100. In a flat woven preform, weft yarn 18 weaves through some or all of the bottom layer warp yarns 15 in the base 10 before interweaving with the top layer warp yarns 25.

Notice that weft yarn 18 does not weave with some of the warp yarns in the center of the preform 100 so as create a clevis 30, which separates the legs or flanges 20. Flanges or legs 20 can be formed by lifting the top most layer on either side of the clevis 30 in the direction of the arrows, as shown in FIG. 1, for example. The preform itself can be woven according to any of the methods disclosed in U.S. Pat. Nos. 6,874, 543, and 7,712,488, the entire contents of which is incorporated herein by references.

Figure 2:
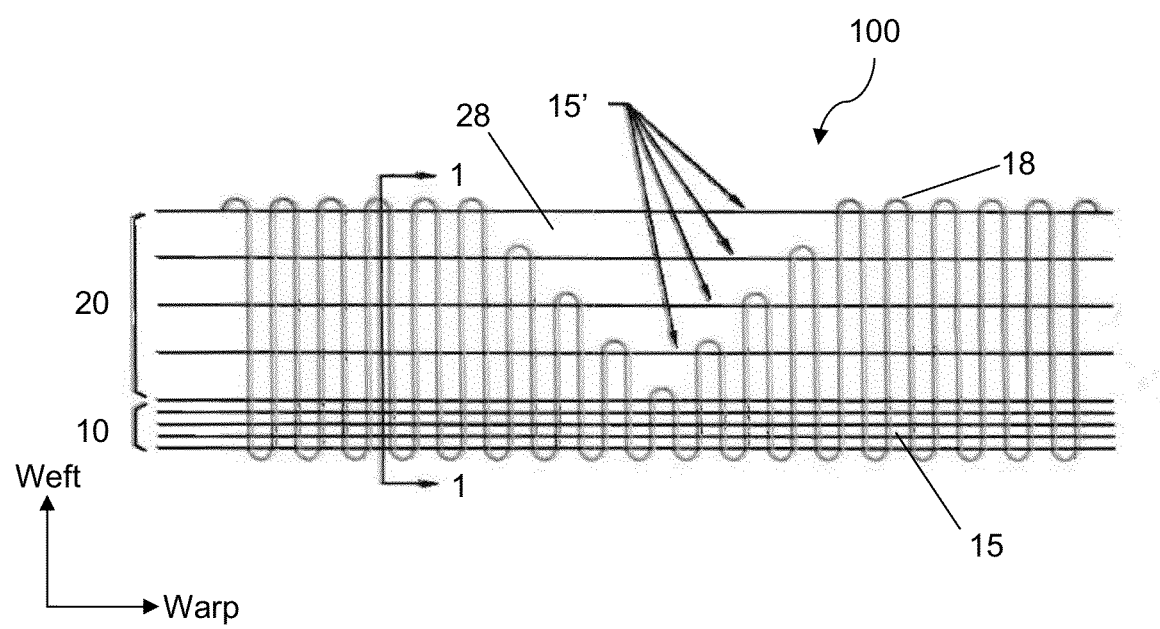
FIG. 2 is a schematic side view of a flat woven corner fitting preform showing warp and weft yarn paths according to one aspect of the present invention.
Figure 5:
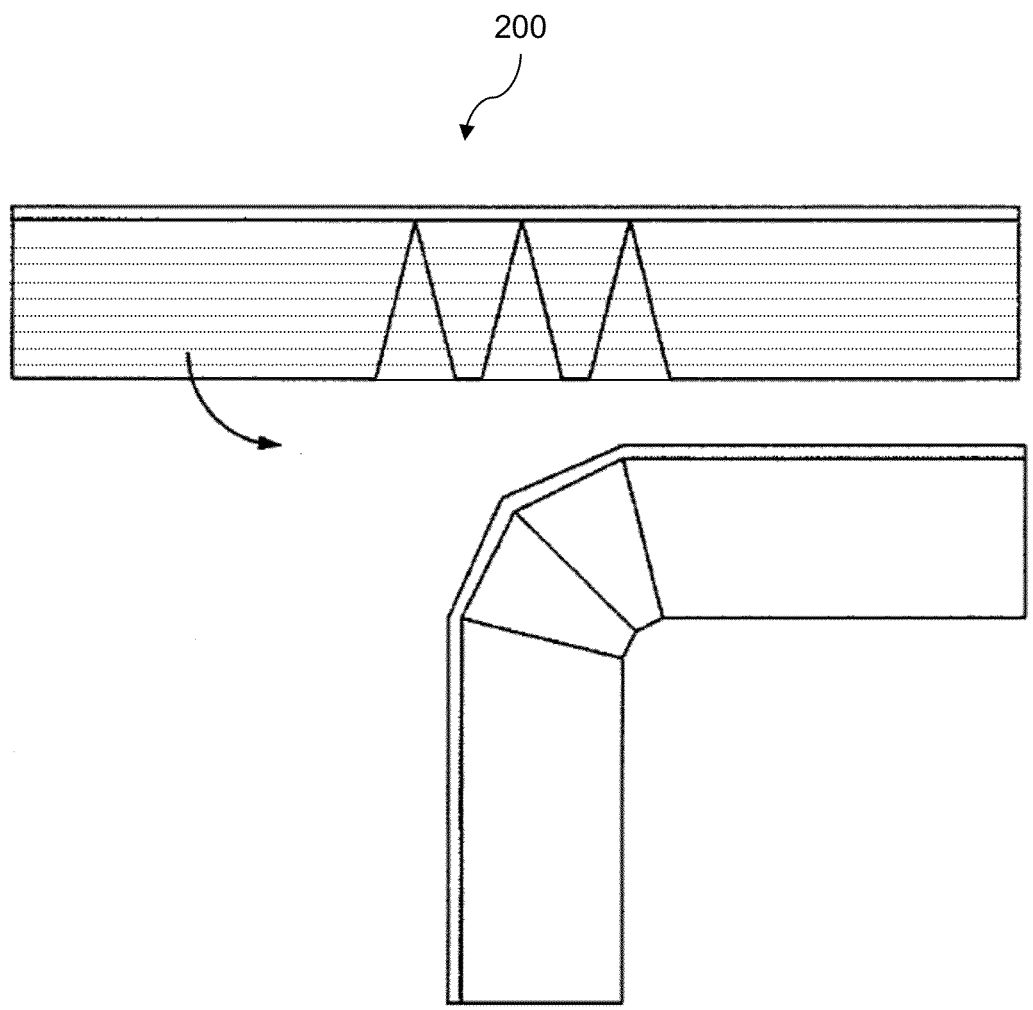
FIG. 5 illustrates a step involved in the method of producing a corner fitting preform according to one aspect of the present invention.

The invention, according to the exemplary embodiment shown in FIG. 2, is based on weaving a preform 100 that has specially engineered areas 28 that have continuous warp yarns 15' which are not woven into the preform 100. In other words, weft yarns 18 integrally weaves with warp yarns 25 in all regions of the legs or flanges 20, except for region 28 where warp yarns 15' in the unwoven areas 28 provide a hinge which allows the flanges or legs 20 of the preform 100 to fold around a corner. As shown in FIG. 2, the "V" portion in the middle of the preform 100 is the area where warp yarns 15' are not weaving with the weft yarns 18, and this area 28 produces the hinge that allows the flanges 20 to be folded around a corner. The shape of the "V" portion is determined based upon the angle by which the flange or leg 20 has to be rotated or the shape of the corner into which the preform has to be fitted. For example, if the preform 100 is used to produce a structure that does not necessarily have to fit into a right angled corner, but in a corner that has an angle greater than 90 degrees, then the "V" portion in such a preform would be narrower than that having a 90 degree curvature. Similarly, if the angle of the corner is less than 90 degrees, then the "V" portion of the corner fitting preform may be wider than that having a right angled shape. One of ordinary skill in the art can envision that using the same technique of producing unwoven areas along the flanges or legs of the preform, a smooth curvature can be produced by varying the fringe area according to the shape of the curve. An example of a preform 200 formed using multiple "V" portions is shown in FIG. 5, for example.

Figure 3:
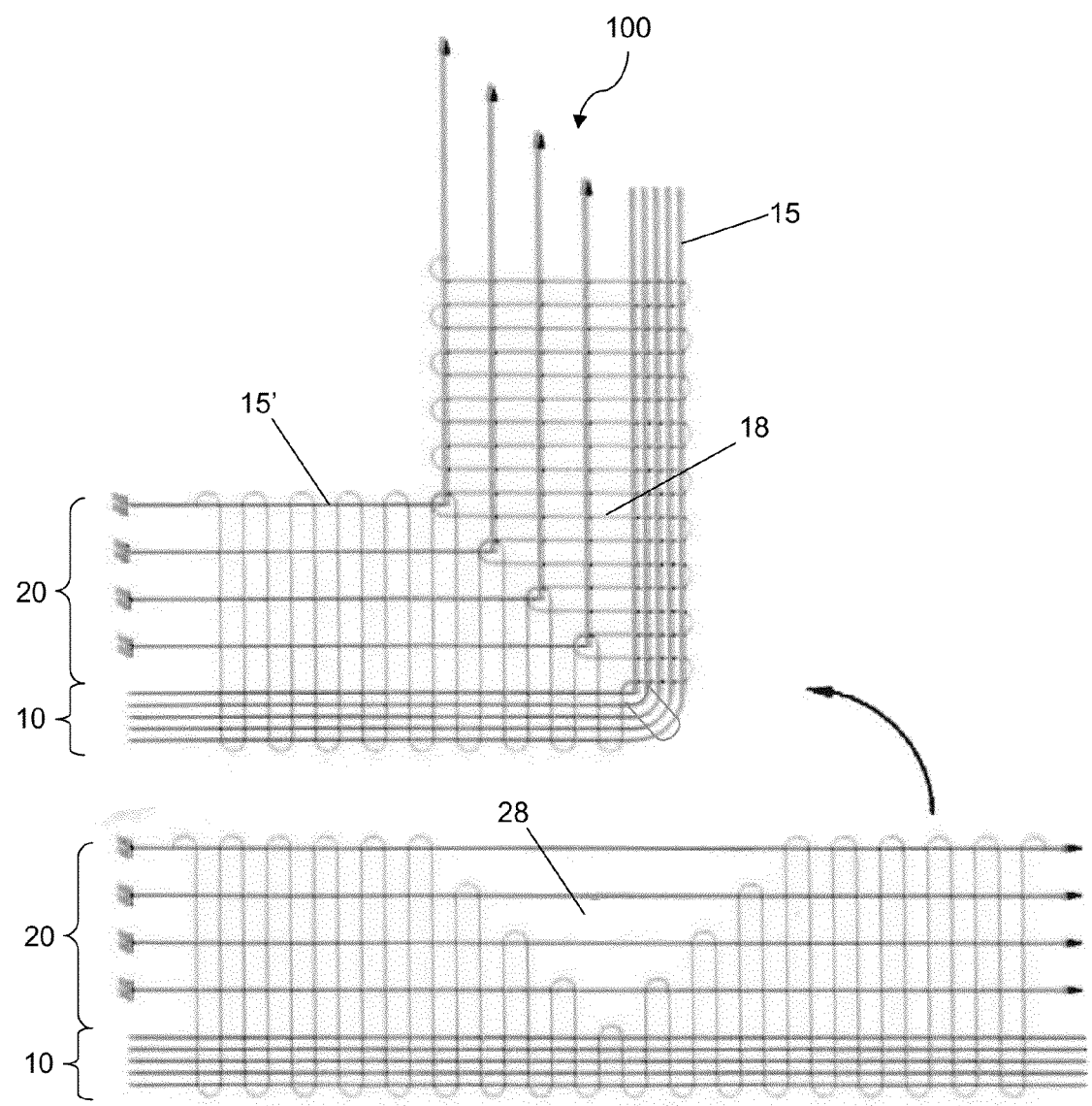
FIG. 3 illustrates a step involved in the method of producing a corner fitting preform according to one aspect of the present invention.

The next step in forming the corner fitting preform 100 is to fold the preform in the direction of the arrow, as shown in FIG. 3, for example. After folding, the excess unwoven warp yarns 15' are pulled back through the woven portion of the legs or flanges 20 in the direction of the arrows to produce a preform 100 with continuous warp yarn 25 reinforcement around the corner, as shown in FIG. 3, for example. FIG. 3 is a schematic of an as-woven Pi preform that includes the corner feature, as described in the above exemplary embodiment. It should be noted, however, that the structures shown in FIGS. 1-3, and 5 are just for illustration purposes, and the actual preform can comprise one, two, three or more legs or flanges 20, i.e. the cross sectional shape does not have to be a Pi, and the present methods can be used to produce other shapes, such as 'T' or 'L' shapes.

EXAMPLE

Figure 4:
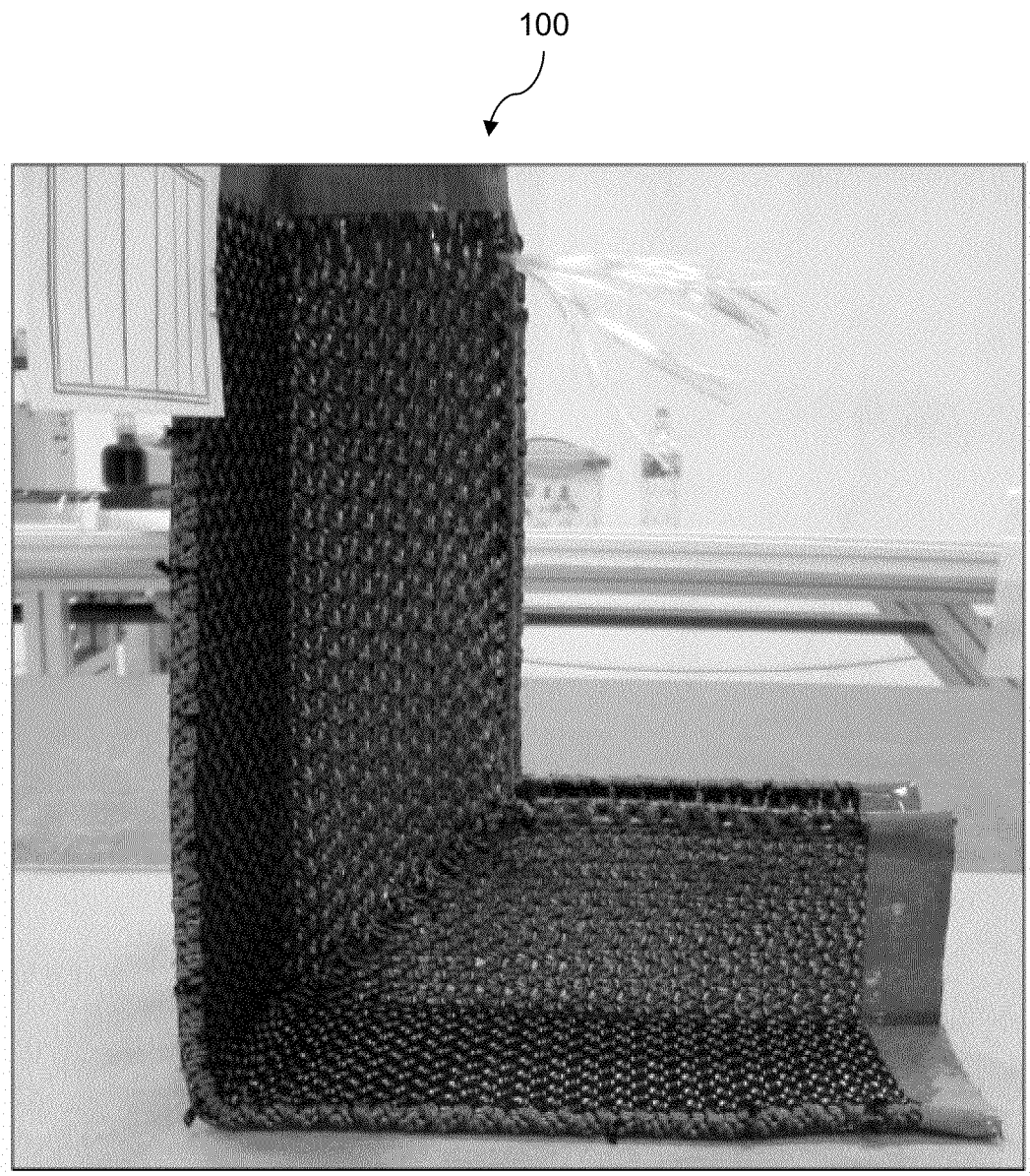
FIG. 4 is a photograph of an actual corner fitting preform produced according to one aspect of the present invention.

A prototype preform 100 has been woven to validate this approach, and is shown in FIG. 4, for example. Preform 100 was woven using carbon fibers; however, this invention is applicable to fibers made of any material suitable for the purpose and accordingly is not limited to the material mentioned herein, e.g. the reinforcement component may be made from materials such as nylon, rayon, glass, carbon, ceramic, aramid, polyester and/or other materials which exhibit desired physical, thermal, chemical and/or other properties. The invention is also applicable to practically any other fiber including but not limited to those that can be stretch broken, e.g. stretch broken carbon fiber, glass, ceramic, and those that cannot be stretch broken or need not be stretch broken, e.g. Discotex® produced by Pepin Associates Inc., which when woven into a textile structure allows the textile structure to stretch in its reinforcement direction, permitting the formation of complex shapes from simple preform starting shapes.

Preform 100 was woven on a conventional shuttle loom using a plain weave pattern. This pattern was chosen because it includes more crimp than other common patterns, such as twills or satins, and presents the most difficult challenge for the fiber transfer process in a single layer of fabric. However, as previously mentioned, any weave pattern could be used to produce the preform.

The present invention has been described primarily herein with respect to the formation of a corner fitting preform. In application such a corner fitting may be used in situations where it is desirable to reinforce a joint of two or more sections of an apparatus. For example in the aerospace industry there is often need to reinforce the joint between a skin material and an instance where both longitudinal and transverse stiffeners are supporting the skin.

The final preform may be impregnated with a matrix material, such as for example, epoxy, bismaleimide, polyester, vinyl-ester, ceramic, and carbon, using resin impregnation methods such as resin transfer molding or chemical vapor infiltration, thereby forming a three dimensional composite structure.

Although preferred embodiments of the present invention and modifications thereof have been described in detail herein, it is to be understood that this invention is not limited to these embodiments and modifications, and that other modifications and variations may be effected by one skilled in the art without departing from the spirit and scope of the invention as defined by the appended claims.

What is claimed is:

1. A corner fitting preform comprising:
   two or more layers of warp yarns or fibers interwoven with one or more layers of weft yarns or fibers;
   a base layer comprising the interwoven warp and weft yarns; and
   one or more flanges or legs extending from the base layer,
   wherein the one or more flanges or legs are integrally woven with the base layer,
   wherein the one or more flanges or legs are folded around a corner, and
   wherein the one or more flanges or legs each include a portion having continuous warp yarn reinforcement that is not woven around the corner, said portion enabling the one or more flanges or legs to fold around the corner.

2. The preform according to claim 1, wherein the preform is flat woven.

3. The preform according to claim 1, further comprising a clevis separating two or more flanges or legs extending from the base layer.

4. The preform according to claim 1, wherein the one or more flanges or legs are folded at an angle equal to, less than, or greater than 90 degrees.

5. The preform according to claim 1, wherein the one or more flanges or legs are folded to form a smooth curvature.

6. The preform according to claim 1, wherein the preform is 'Pi', 'T' or 'L' shaped.

7. The preform according to claim 1, wherein the warp and weft fibers or yarns are made from a material selected from the group consisting of glass, carbon, ceramic, aramid, polyester, nylon, and rayon.

8. The preform according to claim 7, wherein the warp and/or weft fibers are stretch broken carbon fibers, glass, or ceramic.

9. A three-dimensional fiber reinforced composite structure comprising the preform according to claim 1.

10. The composite structure according to claim 9, further comprising a matrix material.

11. The composite structure according to claim 10, wherein the matrix material is selected from the group consisting of epoxy, bismaleimide, polyester, vinyl-ester, ceramic, and carbon.

12. A method of forming a corner fitting preform, comprising the steps of:
    weaving two or more layers of warp yarns or fibers with one or more layers of weft yarns or fibers to form a base layer and one or more flanges or legs extending from the base layer,
    wherein the one or more flanges or legs are integrally woven with the base layer; and
    providing at least one portion in each of the one or more flanges or legs where continuous warp yarn reinforcements are not woven with the weft yarns around a corner, said portion enabling the one or more flanges or legs to fold around the corner.

13. The method according to claim 12, further comprising the step of:
    folding the one or more flanges or legs around a corner.

14. The method according to claim 13, further comprising the step of:
    pulling back the unwoven warp yarns through the woven portion of the legs or flanges to produce a preform with continuous warp yarn reinforcement around the corner.

15. The method according to claim 12, where the preform is woven on a conventional loom.

16. The method according to claim 12, further comprising the step of:
    creating a clevis separating two or more flanges or legs extending from the base layer.

17. The method according to claim 13, wherein the one or more flanges or legs are folded at an angle equal to, less than, or greater than 90 degrees.

18. The method according to claim 13, wherein the one or more flanges or legs are folded to form a smooth curvature.

19. The method according to claim 12, wherein the preform is 'Pi', 'T' or 'L' shaped.

20. The method according to claim 12, wherein the warp and weft fibers or yarns are made from a material selected from the group consisting of glass, carbon, ceramic, aramid, polyester, nylon, and rayon.

21. The method according to claim 12, wherein the warp and/or weft fibers arc stretch broken carbon fibers, glass, or ceramic.

22. A method of forming a three-dimensional fiber reinforced composite structure comprising the method as claimed in claim 12.

23. The method according to claim 22, further comprising the step of:
    at least partially impregnating the preform in a matrix material.

24. The method according to claim 23, wherein the matrix material is selected from the group consisting of epoxy, bismaleimide, polyester, vinyl-ester, ceramic, and carbon.

* * * * *